Feb. 14, 1950 — R. L. LITTLEJOHN — 2,497,087
RECORDING MEASURING DEVICE
Filed April 1, 1947 — 4 Sheets-Sheet 1

INVENTOR.
ROBERT L. LITTLEJOHN.
BY
Huebner, Maltby & Bechler
ATTORNEYS.

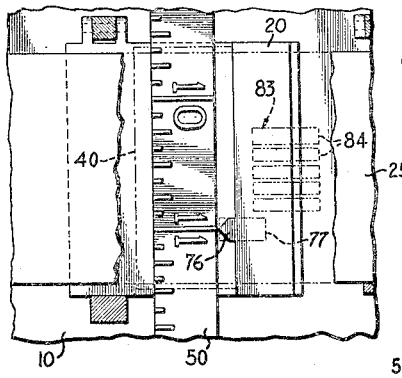
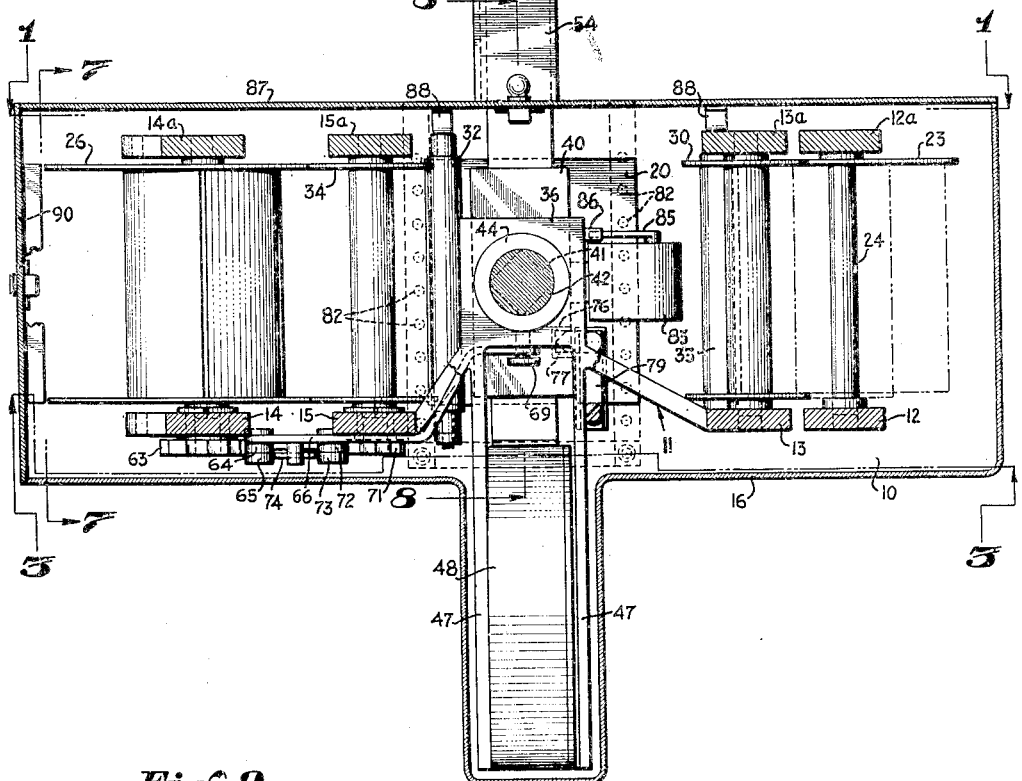
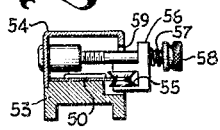

Feb. 14, 1950   R. L. LITTLEJOHN   2,497,087
RECORDING MEASURING DEVICE
Filed April 1, 1947   4 Sheets-Sheet 3

INVENTOR.
ROBERT L. LITTLEJOHN.
BY
Huebner, Malsby & Bechler
ATTORNEYS.

Feb. 14, 1950　　　　　R. L. LITTLEJOHN　　　　　2,497,087
RECORDING MEASURING DEVICE
Filed April 1, 1947　　　　　　　　　　　　　　　　4 Sheets-Sheet 4

INVENTOR.
ROBERT L. LITTLEJOHN.
BY
Huebner, Maltby & Buehler
ATTORNEYS.

Patented Feb. 14, 1950

2,497,087

UNITED STATES PATENT OFFICE 2,497,087

RECORDING MEASURING DEVICE

Robert L. Littlejohn, Los Angeles, Calif.

Application April 1, 1947, Serial No. 738,663

5 Claims. (Cl. 33—138)

This invention relates to measuring apparatus and more especially to a tape measuring device incorporating features for making a printed record of measurement readings.

An object of the invention is to provide a simple, practical and efficient recording tape measuring device.

Another object of the invention is to provide, in a recording tape measuring device, means for automatically recording the several readings of articles measured.

An additional object of the invention is to provide a recording tape measure device wherein a plurality of measurements may be recorded, the several measurements being identified by serially numbered identifying means.

A further object of the invention is to provide a recording tape measure device having an adjustable stop or zero setting abutment whereby the device may record the adjusted length of connected elements such as pipe, the readings of the device being adjusted to allow for the effective additional length of coupling elements.

Another object of the invention is to provide in a recording tape measuring device improvements in construction whereby errors in manipulation or reading may be substantially eliminated.

Another object of the invention is to provide a recording tape measure device adapted for the accumulation of the several recordings on a tape or for the dispensing of the tape immediately after the entry of the recording thereon.

Other objects and advantages will appear and be brought out more fully in the following specification considered with reference to the accompanying drawings throughout which like parts are designated by like numerals.

In the drawings:

Figure 2 is a plan view of the same in section, the section being taken along the line 2—2 of Figure 1.

Figure 9 is a sectional view taken along the line 9—9 of Figure 7.

Figure 10 is a fragmentary sectional view taken along the line 10—10 of Figure 1.

Figure 1:
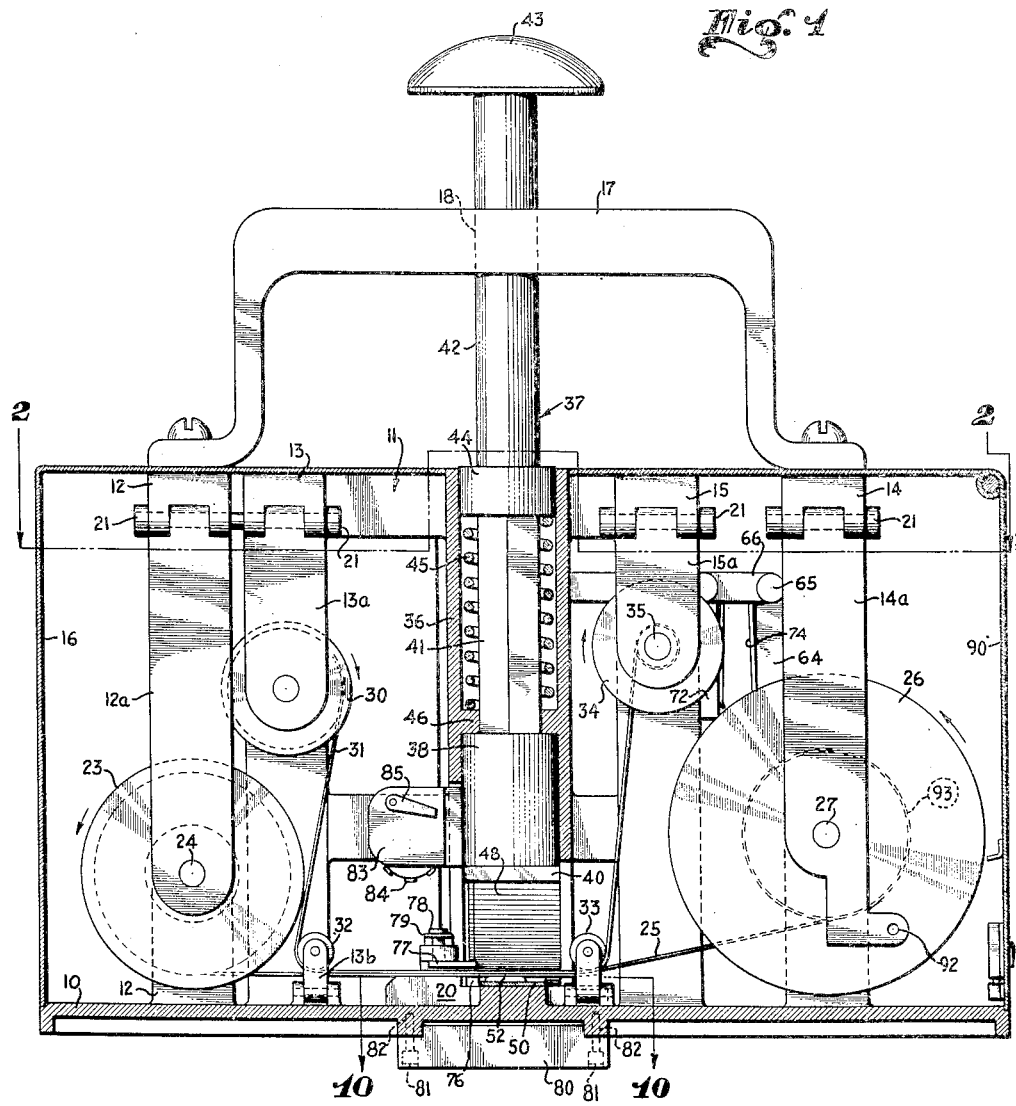
Figure 1 is a view in sectional elevation of an embodiment of my invention, the section being taken along the line 1—1 of Figure 2.

Referring more particularly to the drawings I show a measuring device having a base plate member 10 of any suitable material and generally rectangular in shape on which is suitably mounted a frame structure 11 which may include a plurality of L-shaped bracket members 12, 13, 14 and 15. The frame structure and bracket members may, if desired, be cast or otherwise formed integrally. A casing or cabinet 16 is provided, as shown, and may be suitably secured to the base 10 and the frame or bracket members, and a handle 17 is suitably secured to bracket members 12 and 14 and is provided with an opening 18 for the plunger member to be presently described.

Figure 7:
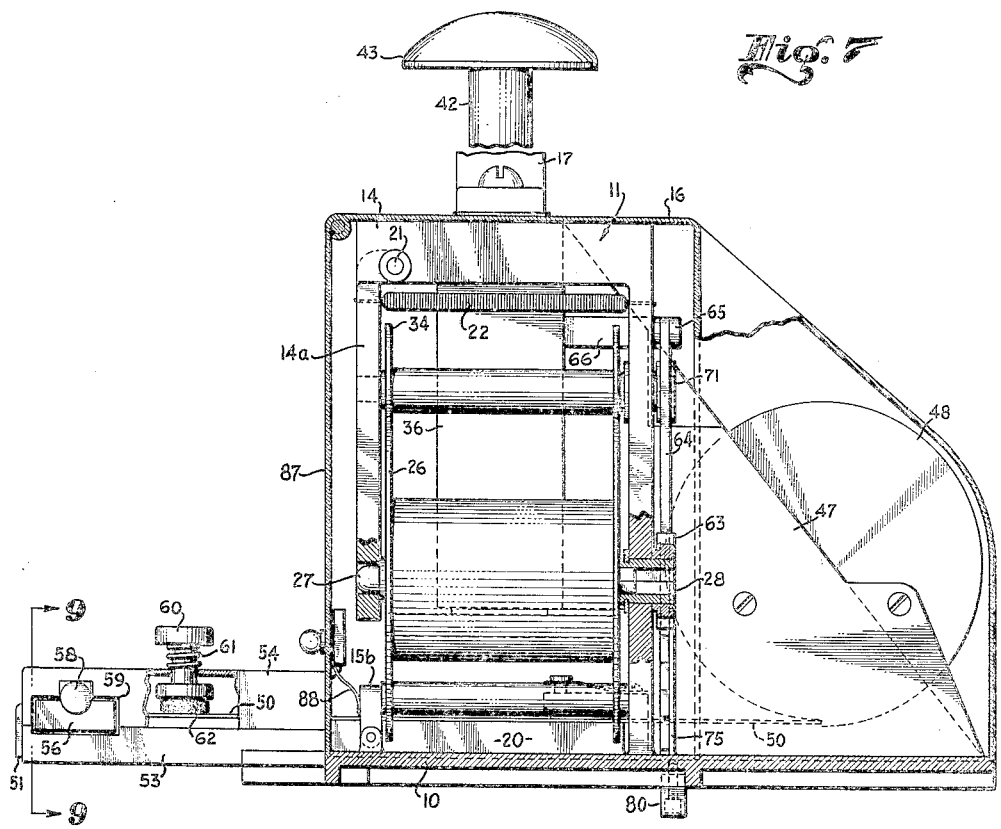
Figure 7 is a view in sectional elevation, a section being taken along the line 7—7 of Figure 2.

An anvil plate 20 is formed integrally with or suitably secured to base 10 and a plurality of pivots 21 each secure bracket arms 12a, 13a, 14a and 15a to the respective brackets 12, 13, 14 and 15. A spring 22 is provided for each bracket and bracket arm, whereby the bracket arms are held in the position shown in Figure 7, however being retractable to release the rollers secured thereby in a manner to be presently described.

A roller 23 having a shaft 24 is bearing mounted between bracket 12 and bracket arm 12a and is adapted to have a roll of blank paper tape 25 wound thereon. Tape 25, as it is unwound from roller 23, passes over anvil plate 20 and is wound on a take-up roller 26 having a shaft 27 which is bearing mounted at one end in bracket arm 14a, a shaft sleeve 28 for the other end of shaft 27 being bearing mounted in bracket arm 14 and suitably keyed to shaft 27, such as by rectangular sections of the end of the shaft and shaft sleeve.

A roller 30 having bearing mounting in bracket 13 and bracket arm 13a has wound thereon a tape 31, which tape may be an inking tape or be of carbon character to effect a print on tape 25 of the indicia on measuring tape 50. Tape 31 is drawn around the guide roller 32 which has a bearing mounting between bracket 13 and a retractable bearing bracket 13b, tape 31 being guided over tape 25 and anvil 20 and guided by a guide roller 33 and wound on a roller 34 having a shaft 35 bearing mounted between bracket 15 and bracket arm 15a in a manner similar to shaft 27.

Frame 11 has a plunger shell portion 36 in which a plunger unit 37 is reciprocable, the plunger having a member 38 on the lower face of which is secured a pressure plate 40 directly above anvil plate 20. The plunger unit includes a stem 41 secured to member 38 and a stem 42 which extends through opening 18 and has a knob 43 at its upper end. A collar 44 is positioned between stems 41 and 42 and serves as a retainer for a spring 45 which seats on an abutment flange 46 in shell 36.

Frame 11 provides a pair of spaced plate members 47 between which is secured a cylindrical casing 48 which serves as the housing for the coiled inner end of the measuring tape 50, the housing providing a coiled spring for normally retracting the tape after extension thereof in well known manner. Tape 50 has a free end 51 and is provided with graduations 52 and numerical indicia designating the length thereof, the graduations and indicia being embossed to effect a printing on blank tape 25 in a manner to be presently described.

Tape 50 extends over anvil plate 20 below tape 25 and transverse thereto and extends over an extension plate 53 which is suitably secured to base 10, extension plate 53 providing a support for a tape guide housing 54. A pair of concave rollers 55 are mounted on a yoke 56 and urged into engagement with one edge of tape 50 by spring 57 on an adjustable tension screw 58 suitably mounted to housing 54 which has an opening 59 to receive these parts. Housing 54 provides mounting for a plunger 60 having a spring 61 for mounting thereon, the plunger extending into the housing and having a friction shoe 62 which may be pressed against the tape 50 to hold it steady while making a recording of a measurement.

Figure 6:
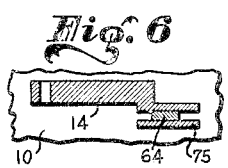
Figure 6 is a sectional view taken along the line 6—6 of Figure 3.

Roller 26 is rotated for take-up of tape 25 by means of a toothed gear or ratchet wheel 63 which is suitably secured on shaft sleeve 28, gear 63 being engageable by rack bar 64 which is pivoted at 65 at one end of rock lever 66 which, in turn, is pivoted at 67 on bracket 15. Member 66 is connected by link 68 to a pin 69 which extends through a slot 70 in shell 36 and is secured to plunger member 38. A ratchet gear 71 is similarly secured to the shaft of take-up roller 34 and is actuatable by rack bar 72 pivoted at 73 on rock lever 66. A spring 74, suitably secured on the rock lever, engages rack bars 64 and 72 to urge them into gear engaging position. Bracket 14 has an extension portion providing a guide slot 75 for the lower end of rack bar 64, as shown in Figures 3 and 6.

Figure 5:
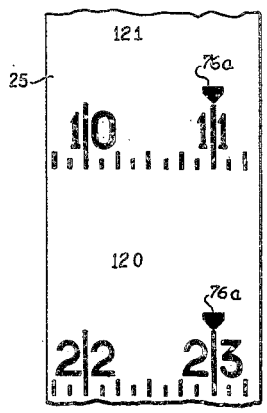
Figure 5 is a fragmentary view showing a portion of a recording tape having a plurality of readings thereon.

Anvil 20 is formed with a boss 76 which is positioned adjacent the path of tape 50 and under a portion of a pressure plate 77 secured to a plunger 78 which extends through a bracket portion of the anvil plate. A spring 79 normally retains plunger 78 and pressure plate 77 in uppermost position and over tapes 25 and 31, pressure plate 77 being under a portion of pressure plate 40 so as to be actuated thereby to effect pressural engagement of tapes 25 and 31 on boss 76 to print an indicating mark such as 76a, as shown in Figure 5.

Figure 3:
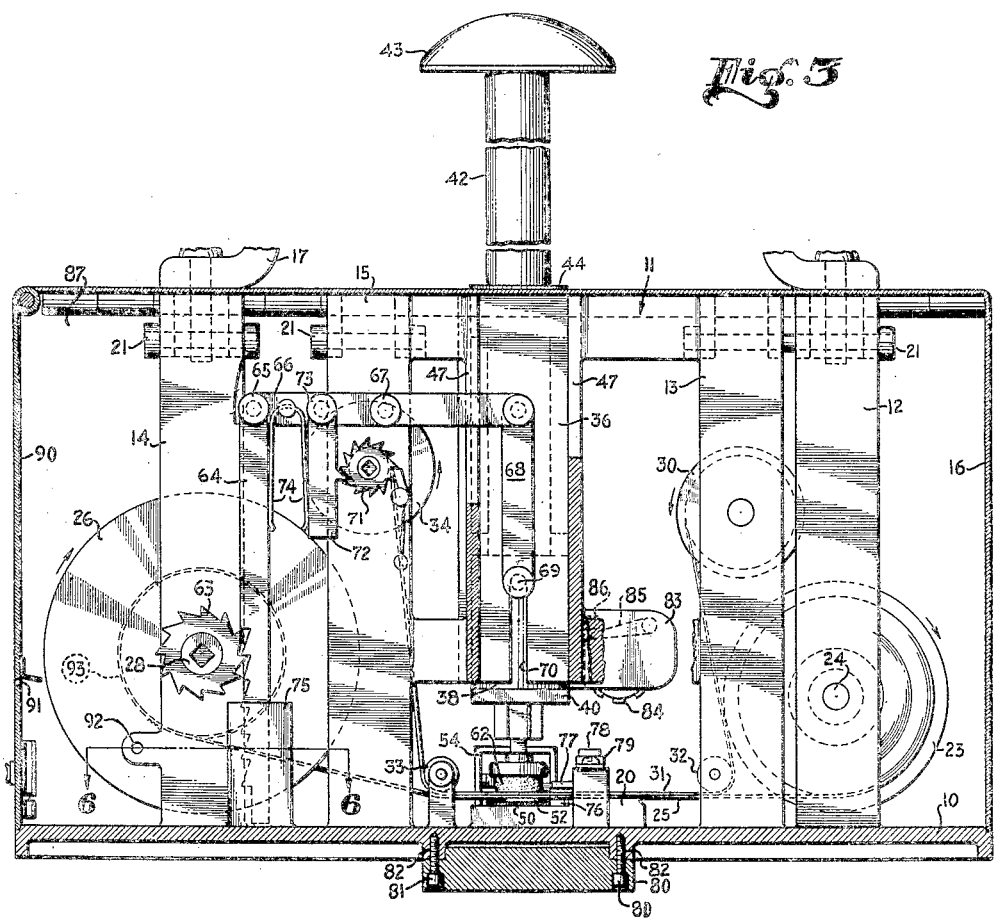
Figure 3 is a view in sectional elevation of the same, a section being taken along the line 3—3 of Figure 2.
Figure 4:
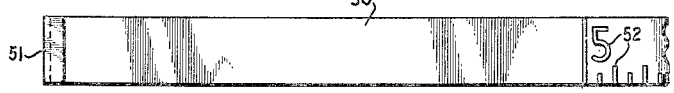
Figure 4 is a fragmentary view showing the free end of the measuring tape.

Cabinet 16 is also formed with an end cover 90 hingedly mounted thereto or otherwise removable, cover 90 being formed with a transverse slot 91 (see Fig. 3). Tape 25, instead of being rolled up on roller 26 may be fed out through slot 91 so as to permit the direct and immediate reading of the recording thereon. In this case roll 26 is removed and replaced by a roller of about the diameter indicated at 93, such roller engaging tape 25 between itself and an auxiliary roller that may be rotatably mounted between bearing bracket portions of bracket 14 and bracket arm 14a in bearing openings 92.

The operation of the invention should be apparent from the foregoing description. The device may be applied to articles to be measured, such as a length of pipe, by being placed thereon at one end with the end abutting against abutment plate 80 and extension housing 54 directed toward the other end of the pipe. Tape 50 is thereupon unrolled and extended until end 51 reaches the other end of the pipe or article to be measured. Thereupon plunger unit 37 is depressed causing pressure plate 40 to compress tapes 25 and 31 on anvil plate 20. This pressure causes the printing of the embossed indicia 52 to be printed on blank tape 25. At the same time pressure plate 40 actuates pressure plate 77 through tapes 25 and 31 and causes an imprinting of indicator 76, thereby recording the impression thereof, 76a, as shown in Figure 5, on blank tape 25.

An abutment member or stop plate 80 is secured as by a pair of screws 81 underneath base 10, the screws being held in selected opposite pairs of threaded bores 82, there being a plurality of these bores to permit plate 80 to be positioned in any of the several positions either directly under boss 76 or on one side thereof, either toward the end 51 of tape 50 or away from the end whereby adjusted readings of tape 50 may be recorded when the measuring device is used for measuring lengths of pipe and to adjust for the effective additional length of collars or other couplings which affect the recorded length of a stand of pipe in a manner which should be clear to those skilled in the art.

A numbering device 83 is suitably secured to plunger member 38 and has a plurality of printing wheels 84 and an actuating lever 85 which engages a stop 86 each time the plunger is actuated, whereby the numbering device records on blank tape 25 serially numbered indicia, such as "120, 121" of Figure 5, to identify the particular measurement recorded on tape 25.

The cabinet 16 is provided with a side cover 87 which may be hinged thereto or otherwise arranged to be opened and a pair of springs 88 are secured to cover 87, each spring engaging one of the bracket arms 13a and 15a to retain the bracket arms in position for proper operation of rollers 32 and 33. Thus, when the cover member 87 is opened, the bracket arms 12a, 13a, 13b, 14a, 15a or 15b may be pivoted outwardly to free the outer ends of the respective roller shafts to permit changing or adjusting the tapes 25 or 31.

Upon releasing plunger unit 37 the upward stroke thereof causes a rocking of lever 66 and a downward movement of rack bars 64 and 72 which, by their respective engagement with ratchet gear wheels 63 and 71, cause rollers 26 and 34 to be rotated an amount to progress tapes 25 and 31 to positions over tape 50 and anvil plate 20 for a recording of a successive measurement of tape 50. The downward movement of the plunger causes numbering device 83 to print a number, such as 120 or 121 (Figure 5), on the blank tape 25, which identifies the recorded impression of the tape 50 on the blank tape and, upon upward movement of the plunger, lever 85 of the numbering device is engaged by stop 86 which turns the number wheels of the numbering device to the next number.

Figure 8:
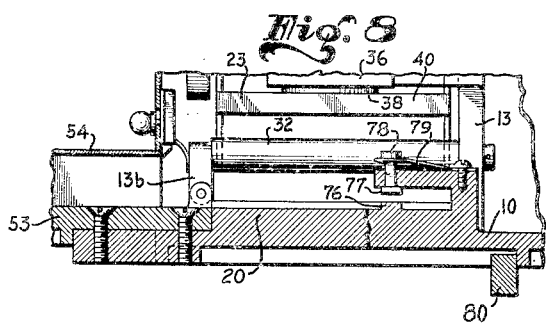
Figure 8 is a fragmentary sectional view taken along the line 8—8 of Figure 2.

In order to prevent a slipping or shifting of tape 50 after a setting thereof for a recording during manipulation of the plunger unit 37, the plunger 60 may be depressed manually so that friction shoe 62 holds tape 50 from accidental movement which might effect the accuracy of the recorded measurement. When the device is used in connection with the measurement of a length of pipe to comprise a stand, the aggregate length of which stand is to be determined as the number of the sum of recorded measurements, it may be desirable to have the recordings adjusted to compensate for the effective length of each stand, which includes the actual length of each pipe and an additional length equal to the distance from an end thereof to the center of a collar and such compensation is provided for by shifting of plate 80 to the right of a position below pointer 76, as seen in Figure 8, and if compensated readings which include such additional distances should be compensated for by deduction of such distances, plate 80 may be moved to a position to the left of pointer 76, as should be clear to those skilled in the art.

It will be observed that the casing of the cabinet, side and end covers 87 and 90, as well as bracket arms 12a, 13a, 13b, 14a and 15a are hinged so as to permit access to and removal of the rollers and tapes 25 and 31 for adjustment or replacement as found necessary.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices and systems.

Having thus described my invention, what I claim and desire to secure by Letters Patent is:

1. A measuring device comprising, in combination, a frame having an anvil plate, a measuring tape having one end wound on a roller rotatably carried by said frame and being longitudinally movable over said anvil plate, said tape having embossed indicia thereon, a blank tape wound on a roller mounted on said frame, said tape being movable over said anvil and measuring tape and a plunger member movable toward said anvil for effecting pressure engagement of said tapes between said plunger and anvil.

2. A measuring device comprising, in combination, a frame having an anvil plate, a measuring tape having one end wound on a roller rotatably carried by said frame and being longitudinally movable over said anvil plate, said tape having embossed indicia thereon, a blank tape wound on a roller mounted on said frame, said tape being movable over said anvil and measuring tape transversely of the direction of movement of said measuring tape, and a plunger member over and movable toward said anvil for effecting pressure engagement of said tapes between said plunger and said anvil.

3. A measuring device comprising, in combination, a frame having an anvil plate, a measuring tape having one end wound on a roller rotatably carried by said frame and being longitudinally movable over said anvil plate, said tape having embossed indicia thereon, a blank tape wound on a roller mounted on said frame, said tape being movable over said anvil and measuring tape, and inking tape movable over said blank tape, an embossed pointer on said anvil plate adjacent the path of movement of the measuring tape thereover, a plunger member over and moveable toward said anvil for effecting pressure engagement of said tapes between said plunger and said anvil.

4. A measuring device comprising, in combination, a frame having an anvil plate, a measuring tape having one end wound on a roller rotatably carried by said frame and being longitudinally moveable over said anvil plate, said tape having embossed indicia thereon, a blank tape wound on a roller mounted on said frame and moveable over said anvil and measuring tape, an inking tape moveable over said blank tape, an embossed pointer on said anvil plate adjacent the path of movement of the measuring tape thereover, a plunger member over and moveable toward said anvil for effecting pressure engagement of said tapes between said plunger and said anvil and means to advance said blank and inking tapes when said plunger is actuated, and an abutment plate mounted on said frame and projecting outwardly therefrom below said anvil plate to be engaged by one end of an element to be measured, and positioning and holding means releasably holding said abutment plate on said frame for adjustment in a direction parallel to the direction of extension of said measuring tape.

5. A measuring device comprising, a body portion, a reel mounted on one side of said body portion, a measuring tape wound on said reel and adapted to be extended from said reel and along and beyond said body portion, a moveable abutment carried by said body portion on the side thereof opposite said reel, said abutment defining a work engaging face extending generally normal to the direction of extension of said tape, and holding and positioning means releasably holding said abutment on said body portion for adjustment in a direction parallel to the direction of extension of said tape.

ROBERT L. LITTLEJOHN.

REFERENCES CITED

The following references are of record in the file of this patent:

UNITED STATES PATENTS

| Number | Name | Date |
| --- | --- | --- |
| 1,237,808 | Ottinger | Aug. 21, 1917 |
| 1,560,392 | Mager | Nov. 3, 1925 |
| 1,759,482 | Gendron | May 20, 1930 |
| 1,788,236 | Hatmaker | Jan. 6, 1931 |
| 1,820,187 | Gaynor | Aug. 25, 1931 |
| 1,875,119 | Ohmer et al. | Aug. 30, 1932 |
| 2,086,363 | McMullen | July 6, 1937 |